(12) United States Patent
Sharon et al.

(10) Patent No.: US 9,287,713 B2
(45) Date of Patent: Mar. 15, 2016

(54) TOPOLOGY IDENTIFICATION IN DISTRIBUTION NETWORK WITH LIMITED MEASUREMENTS

(75) Inventors: Yoav Sharon, Brighton, MA (US); Anuradha Annaswamy, West Newton, MA (US); Motto Alexis Legbedji, Princeton, NJ (US); Amit Chakraborty, East Windsor, NJ (US)

(73) Assignees: Siemens Aktiengesellschaft, Munich (DE); Massachusetts Institute of Technology, Cambridge, MA (US)

( * ) Notice: Subject to any disclaimer, the term of this patent is extended or adjusted under 35 U.S.C. 154(b) by 835 days.

(21) Appl. No.: 13/558,711

(22) Filed: Jul. 26, 2012

(65) Prior Publication Data

US 2013/0035885 A1     Feb. 7, 2013

Related U.S. Application Data

(60) Provisional application No. 61/515,019, filed on Aug. 4, 2011.

(51) Int. Cl.
| | |
|---|---|
| *H02J 3/46* | (2006.01) |
| *G06F 17/50* | (2006.01) |
| *H02J 13/00* | (2006.01) |
| *H02J 3/00* | (2006.01) |

(52) U.S. Cl.
CPC ............... *H02J 3/46* (2013.01); *G06F 17/509* (2013.01); *H02J 13/0079* (2013.01); *G06F 2217/10* (2013.01); *H02J 2003/003* (2013.01); *Y04S 10/54* (2013.01); *Y04S 20/48* (2013.01)

(58) Field of Classification Search
CPC ...... G06F 17/509; G06F 2217/10; H02J 3/46; H02J 13/0079; H02J 2003/003; Y04S 20/48; Y04S 10/54
See application file for complete search history.

(56) References Cited

U.S. PATENT DOCUMENTS

| | | | | |
|---|---|---|---|---|
| 5,742,795 A | * | 4/1998 | Kussel | G06F 17/509 703/2 |
| 2002/0091503 A1 | * | 7/2002 | Carrillo | G06F 17/5004 703/2 |
| 2003/0093390 A1 | * | 5/2003 | Onoda et al. | 705/412 |

OTHER PUBLICATIONS

M. Orr, "Introduction to Radial Basis Function Networks", 1996, Center for Cognitive Science, U. of Edinburgh; http://www.cc.gatech.edu/~isbell/tutorials/rbf-intro.pdf.*

* cited by examiner

*Primary Examiner* — Regis Betsch

(57) ABSTRACT

A statistical technique is used to estimate the status of switching devices (such as circuit breakers, isolator switches and fuses) in distribution networks, using scares (i.e., limited or non-redundant) measurements. Using expected values of power consumption, and their variance, the confidence level of identifying the correct topology, or the current status of switching devices, is calculated using any given configuration of real time measurements. Different topologies are then compared in order to select the most likely topology at the prevailing time. The measurements are assumed as normally distributed random variables, and the maximum likelihood principle or a support vector machine is applied.

22 Claims, 7 Drawing Sheets

500

| BREAKER | APPROXIMATED ERROR RATE (%) | NON-APPROXIMATED ERROR RATE (%) |
|---|---|---|
| NOMINAL | 4.5 | 4 |
| 13-119 (a) | <0.1 | 0 |
| 13-119 (b) | 0.1 | 0 |
| 13-119 (c) | 2.8 | 5 |
| 18-115 (a) | 2.3 | 0 |
| 18-115 (b) | <0.1 | 1 |
| 18-115 (c) | 1.0 | 1 |
| 60-120 (a) | <0.1 | 0 |
| 60-120 (b) | 0.6 | 2 |
| 60-120 (c) | 7.2 | 5 |
| 97-121 (a) | <0.1 | 0 |
| 97-121 (b) | 0.6 | 1 |
| 97-121 (c) | 1.4 | 2 |
| 117-116 (a) | <0.1 | 0 |
| 117-116 (b) | <0.1 | 0 |
| 117-116 (c) | <0.1 | 0 |
| 118-123 (a) | <0.1 | 0 |
| 118-123 (b) | <0.1 | 0 |

FIG. 5 ion network.
TOPOLOGY IDENTIFICATION IN DISTRIBUTION NETWORK WITH LIMITED MEASUREMENTS

CROSS-REFERENCE TO RELATED APPLICATIONS

This application claims the benefit of U.S. Provisional Patent Application Ser. No. 61/515,019, filed Aug. 4, 2011, the contents of which are hereby incorporated by reference herein.

FIELD OF THE INVENTION

This invention relates generally to power distribution systems, and more particularly to methods, systems and computer readable media for identifying a network topology created by open and closed switching devices, based on historical data and on sparse real-time measurements in the network.

BACKGROUND OF THE INVENTION

The concept of electric power system state estimation was initially applied to transmission networks to estimate node voltages, generator power outputs, load demands, and branch power and current flows at a given point in time based on real-time telemetered measurements. This application has generally assumed imperfect but highly redundant measurements, as well as exact power system model topology and electrical parameters. Network topology estimation is an integral part of state estimation and a critical component of modern Energy Management Systems (EMS) or Distribution Management Systems (DMS). The conventional network topology processing (NTP) function monitors the statuses of switching and switchable devices, and determines the model input to the state estimator. As used herein, the term "switching device" encompasses circuit breakers, isolator switches, fuses and other circuit elements that perform the functions of one or more of those devices. Circuit breaker statuses, isolator switch statuses, fuse statuses, and transformer tap positions are examples of real-time inputs used by the network topology processor. A conventional NTP determines the connectivity of the electrical network, taking as input a complete model of the network, comprising nodes and switching devices. The NTP reduces the node-switching-device model to a "bus-branch" model, where the concept of bus defines a maximal subnetwork interconnecting nodes and closed switching devices only. As used herein, the term "bus" includes groups of neighboring buses considered as a single bus, and also includes distribution network nodes. The objective of the conventional NTP is to eliminate all switching devices from the network model, by instantiating their "open" or "closed" statuses. The NTP achieves this instantiation by processing the switching device user-defined, measured, scheduled or normal status, as available in that order of precedence. The conventional state estimation sub-program then solves and analyzes the resulting bus-branch model. Undetected switching device status errors during estimation show up as analog measurement errors in the solution, which are difficult to distinguish from actual analog measurement errors. Hence, reliable and prompt detection of the switching device statuses is crucial for accurate state estimation. The output of the state estimator is a critical input to nearly all other network analysis, security, control and stability assessment applications.

In distribution grid management, a critical task of a system operator is to take quick action to restore continuity of electric power supply following forced outages. For many distribution networks, however, the measurement redundancy is so low that the first and often only indications of an outage are telephone calls from customers reporting loss of supply. In the mostly radial topologies of a distribution network, the opening of a normally-closed switching device generally results in some loss of electric power supply. Clearly, the analysis performed by aggregating and mapping multiple customer calls into a suspected common network device, such as a fuse, which is then suspected to be open, is an instance of network topology estimation. Many existing outage management systems (OMS) are still based on the process of call aggregation, which can take from tens of minutes to hours (if happens at night, for example) to identify the culprit device. An automatic procedure that will reduce the detection time will lead to a much better quality of service and higher revenues to utility companies.

SUMMARY OF THE INVENTION

The present disclosure addresses the needs described above by providing a method for identifying a status of switch devices in a distribution network including a plurality of interconnected buses and the switch devices. A probability model is initially derived for power injections at each of the plurality of interconnected buses, the power injections comprising power consumption and power generation at individual buses, the probability model being derived from historical measurements of power injections. Real time sensor measurements of electrical quantities in the distribution network are then received. From a plurality of network topologies derived from a plurality of possible statuses of the switch devices, a network topology most likely to produce the real time sensor measurements is selected. The selection is based on the probability model.

In one exemplary embodiment, the selection of the network topology most likely to produce the real time sensor measurements includes constructing a plurality of optimization problems. Each optimization problem corresponds to one of the plurality of network topologies. Each of the optimization problem has: (1) a state variable representing voltages of the plurality of interconnected buses in the network; (2) a cost function representing an unlikelihood of a set of power injections for the buses computed from the state variable, given the probability model for the power injections; and (3) constraints requiring that the real time sensor measurements of electrical quantities match corresponding electrical quantities computed from the state variable. In that case, the selection of a network topology corresponding to an optimization problem having a minimum cost is computed from the cost function.

In another aspect of the invention, a non-transitory computer-usable medium is provided having computer readable instructions stored thereon for execution by a processor to perform methods for identifying a status of switch devices in a distribution network as described above.

BRIEF DESCRIPTION OF THE DRAWINGS

FIG. 5 is a table showing calculated error rates of switching device identifications in an example implementation of the invention.

DESCRIPTION OF THE INVENTION

In typical distribution systems, at least in the current state of low penetration of distributed energy sources and communication devices, estimating the network topology is generally more important than estimating the analog variables. That said, the tools for the detection of switching device status in transmission networks do not apply to distribution networks. As the main goal in transmission networks is full state estimation, there is already a redundancy of measurements to state variables in the range of 1.7 to 2.2 (redundancy factor).

Today's distribution networks, in contrast, may have only a few measurements, typically at the substations. While distribution networks normally have many more buses compared to transmission networks, they have relatively fewer switching devices. Equipping switching devices with a sensors would allow for immediate detection of the status while using fewer measurements than would be needed for state estimation. With the decrease in the cost of sensors and communication, and the potential benefit to utility companies, there is room for adding more sensors in places other than the substation. The present work aims to provide a tool for optimizing the location of sensor placement, allowing for the detection of the status of all the switching devices while using fewer measurements than the number of such switching devices.

While the present work does not provide an automatic tool for optimal placement of sensors, it provides a tool that, given the placement of sensors, quickly reveals at what confidence one can detect the status of switching devices. This facilitates the comparison of several sensor placement configurations, and the selection of the one with the highest level of confidence.

Figure 1:
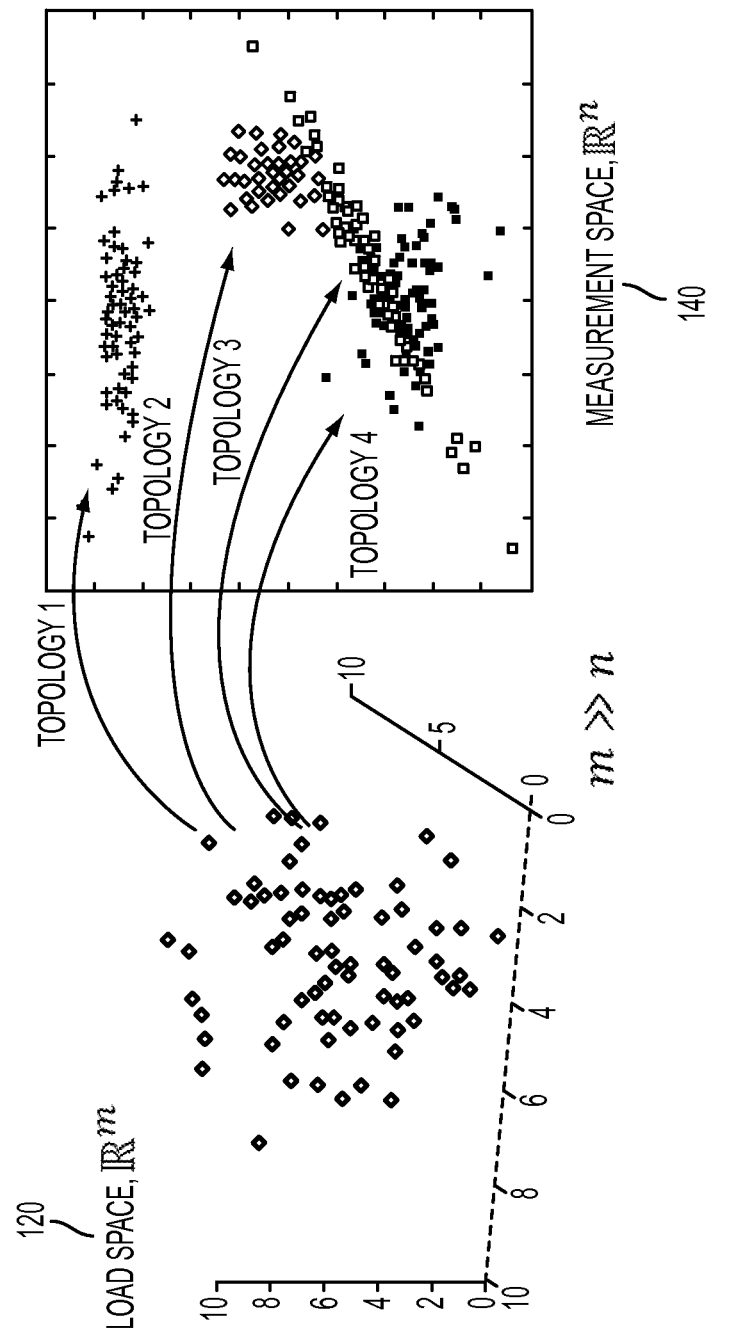
FIG. 1 is a schematic diagram showing a transformation from a load space to a measurement space in accordance with the invention.

One aspect of the described technique is presented with reference to the graphs of FIG. 1. A graph representing the load space 120 includes statistical data representing historic power consumption measurements for each bus in the distribution system under various conditions such as time of day, day of week and weather. As noted above, the large number of buses in a typical power distribution system make it impractical to use real-time load space data sets to identify a current network topology. The presently described technique instead places a relatively small number of sensors at selected points in the distribution network, and uses real-time measurements from those sensors to identify the current network topology.

Figure 2:
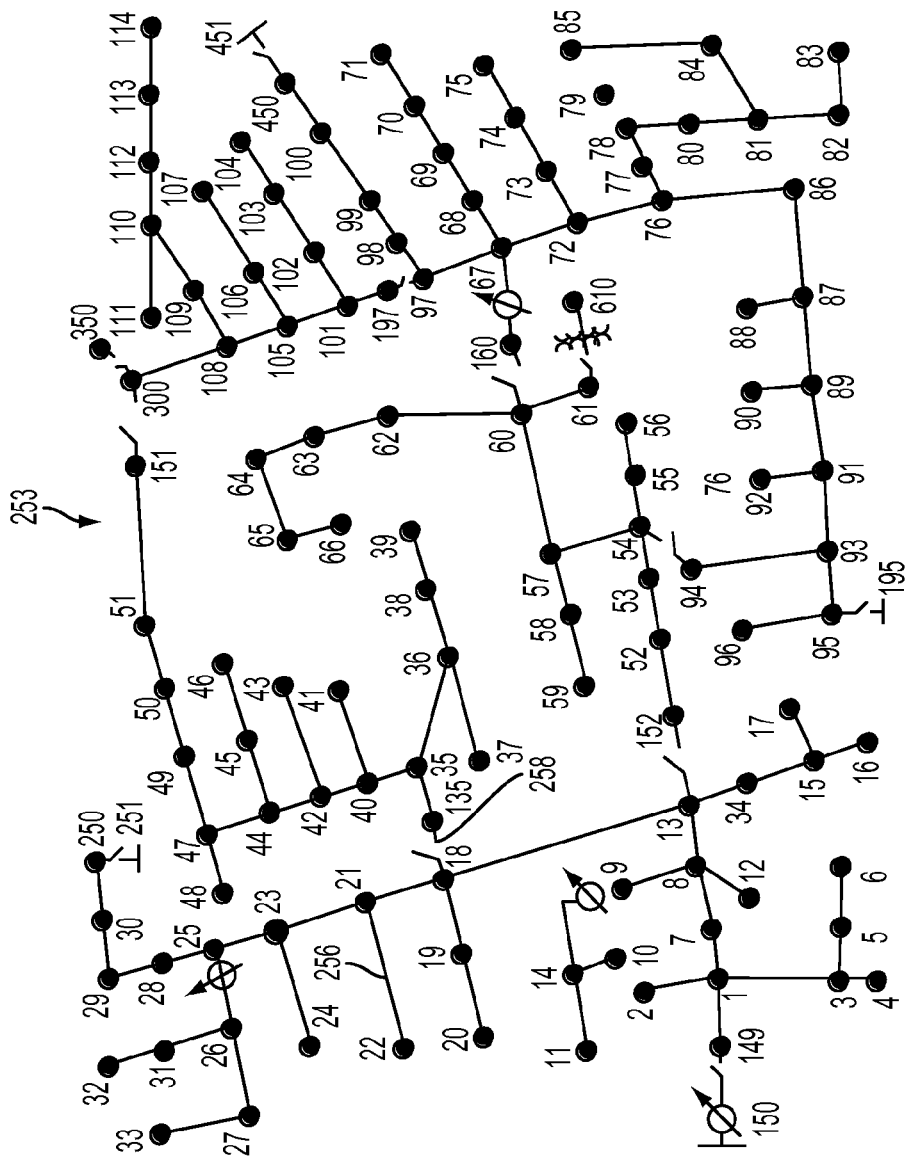
FIG. 2 is a schematic diagram of a typical power distribution network.

Because an expected sensor reading can be calculated from a set of bus power consumption measurements in combination with a description of a given network topology, it is possible to construct an approximate linear transformation from the power consumption measurements to expected real-time sensor measurements. The expected real-time measurements are shown in the measurement space 140 of FIG. 1. Several techniques are discussed below for classifying a particular measurement vector into one of the possile topologies Problem Formulation The power network structure is known, including buses, lines, the impedance of the lines between the connected buses, the admittance of the lines to the ground, the admittance of the buses to the ground, the status of circuit breakers, and the nominal status of the switching devices. An example power network structure 153 is shown in FIG. 2. The numbered circles such as circle 22 are buses labeled with bus indices. The buses are connected by transmission lines with impedance such as line 256. switching devices such as switching device 258 are represented by switch symbols. A limited set of real-time measurements is provided, as detailed below. The measurements may include voltage, current and power flow readings.

The technique utilizes historic data that includes the mean and covariance of the power injection (or extraction) for all buses except one, denoted as the slack bus. For distribution networks it is customary to choose the substation connecting the distribution network to the transmission network as the slack bus. In the network 253 of FIG. 2, bus 149 at the bottom left corner is the slack bus.

Different sets of mean and covariance are gathered for different times of the day (morning, afternoon, evening and night), as well as for different seasons. The objective is to find the actual status of the switching devices from the real-time measurements, which is to identify the current network topology. The goal is to measure the confidence of this identification; in other words, to calculate the probability of identifying one topology as the current one, when in fact it is not.

For any given topology $\mathcal{T}$, which includes the statuses of the switching devices, $L_{\mathcal{T}}$ is used to denote the set of buses which have direct or indirect connection to the slack bus. The notation $|L_{\mathcal{T}}|$ is used to denote the number of such buses. Because the focus is on distribution networks, it is assumed that buses with no connection to the slack bus (islanding) have zero voltage. $x_{\mathcal{T}}$ is used to denote the current state of the network. The state of the system includes the real and imaginary parts of the voltage at every bus that is in $L_{\mathcal{T}}$. If two given buses are connected to each other through a zero impedance line or a switching device whose status is known to be closed a the prevailing time, then since the buses have the same voltage, there are two state variables representing the real and imaginary parts of the voltage, and additional state variables representing the real and reactive power flow between the buses. Two zero-impedance lines connecting the same two buses are considered as one line. In any case, the degrees of freedom in the system become $2|L_{\mathcal{T}}|$ ($x_{\mathcal{T}} \in \mathbb{R}^{2|L_{\mathcal{T}}|}$). Note that in this disclosure, every phase of a bus in a 3-phase system is considered as a separate bus.

Using the classic convention, measurements are classified as real time measurements and as pseudo-measurements. Real time measurements are measurements obtained from sensors readings. $y \in \mathbb{R}^m$ is used where m is the number of real time measurements to denote the real time measurements, and the nonlinear measurement function $f$ is defined such that $y = f_{\mathcal{T}}(x_{\mathcal{T}})$. Pseudo-measurements are known constraints given by the topology of the network. For example, a bus to which no generator or load is connected, has zero real and reactive power injection (two pseudo-measurements). The voltage and the angle (which is arbitrarily set to 0) of the slack bus are two other pseudo-measurements used. The nonlinear constraint function g is defined such that $g_{\mathcal{T}}(x_{\mathcal{T}}) = 0$ if and only if the state $x_{\mathcal{T}}$ satisfies the pseudo-measurements. Let r be the number of pseudo-measurements. n' is defined as the degrees of freedom remaining after constraining the system to the pseudo-measurement. If all the pseudo-measurements are independent of each other (i.e. any single pseudo-measurement can be unsatisfied while all other pseudo-measurements are satisfied), then $n'=2|L_\mathcal{T}|-r$.

If the number of real time measurements is larger than n', then in the absence of any measurements errors, each valuation of the measurements can only correspond to one topology. Another way to say this is that in this case $$\{y \in \mathbb{R}^m | \exists x_\mathcal{T} \in \mathbb{R}^{2|L_\mathcal{T}|} : f_\mathcal{T}(x_\mathcal{T}) = y, g_\mathcal{T}(x_\mathcal{T}) = 0\}$$

is a manifold of dimension strictly less than m and two such manifolds intersect each other over a set of measure zero. In such case theoretically one can identify the correct topology with a confidence level of 100%. In practice, the computational issue of finding the right topology is still a major challenge, and in addition measurement errors can bring the confidence level down. Nevertheless, of interest here is the case where m<n'. While in transmission networks, the typical ratio of measurements to state variables is 1.7-2.2, in distribution networks the number of measurements is indeed much lower than the number of buses.

Let $z_\mathcal{T} \in \mathbb{R}^{2|L_\mathcal{T}|}$ be a vector consisting of the real and imaginary parts of the slack bus voltage, and the $2(|L_\mathcal{T}|-1)$ real and reactive power injections at all other buses in $L_\mathcal{T}$. Let $f_{z,\mathcal{T}}$ be the function such that $z_\mathcal{T} = f_{z,\mathcal{T}}(x_\mathcal{T}) \forall x_\mathcal{T}$. While it is not hard to synthesize special cases where the following is not true, in practice $f_{z,\mathcal{T}}$ is almost always one-to-one. This implies there exists a function $h_\mathcal{T}$ such that $f_{z,\mathcal{T}}(h_\mathcal{T}(z_\mathcal{T})) = z_\mathcal{T} \forall z$.

Let $z \in \mathbb{R}^{2n}$ be the vector consisting of the real and imaginary parts of the slack bus voltage, and the $2(n-1)$ real and reactive power injections at all other buses. Let $I \in \mathbb{R}^{2n \times 2n}$ be the identity matrix, and let $I_\mathcal{T} \in \mathbb{R}^{2|L_\mathcal{T}| \times 2n}$ be a matrix derived from I by keeping only the rows whose indices are the same as the indices of the components of z corresponding to buses in $L_\mathcal{T}$. Thus if $\mathcal{T}$ is the active topology, then $z_\mathcal{T} = I_\mathcal{T} z$. By the problem description, the mean and covariance matrix of all real and reactive power injections except for the slack bus. The mean and the variance of the power injection for buses to which no load or generator are connected will both be zero naturally. Let $\mu_z \in \mathbb{R}^{2n}$ be a vector whose first two components are the real and imaginary parts of the voltage at the slack bus, and its remaining components are the mean and reactive power injection for all other buses. Similarly, let $\Lambda_z \in \mathbb{R}^{2n \times 2n}$ be a matrix whose first two rows and first two columns are zeros, and its bottom right $2(n-1) \times 2(n-1)$ block equal the covariance matrix of the power injections. By assuming a normal distribution, a probability density function $\rho(\cdot; \mu_z, \Lambda_z): \mathbb{R}^{2n} \to \mathbb{R}_+$ can be defined using $\mu_z$ and $\Lambda_z$. It can then be said that z follows the normal distribution using the notation $z \sim \mathcal{N}(\mu_z, \Lambda_z)$. It is noted that $\mu_z$ and $\Lambda_z$ do not depend on the topology. They represent the variation in demand or generation assuming the whole system is connected (no islanding). They do not represent the actual power delivered, which may be zero if the corresponding bus is disconnected from the slack bus.

Let $c: \mathbb{R}^m \to \{1, \ldots, p\}$ be the topology identification function, where p is the number of possible topologies: $\mathcal{T}_1, \ldots, \mathcal{T}_p$. The confidence level is defined as:

$$1 - \max_i Prob\{c(f_{\mathcal{T}_i}(h_{\mathcal{T}_i}(\mathcal{J}_\mathcal{T} z))) \neq i | z \sim \mathcal{N}(\mu_z, \Lambda_z)\}. \tag{1}$$

Minimizing Classification Errors

The first goal is, for each topology $\mathcal{T}$, to assume the random variable $y = f_\mathcal{T}(h_\mathcal{T}(I_\mathcal{T} z))$ as a normal distributed random variable. By linearizing, $$y \approx f_\mathcal{T}(h_\mathcal{T}(I_\mathcal{T} \mu_z)) + A_\mathcal{T}(z - \mu_z)$$

where $$A_\mathcal{T} B \frac{\partial f_\mathcal{T}}{\partial x_{\mathcal{T}|x_\mathcal{T} = h_\mathcal{T}(I_\mathcal{T} \mu_z)}} \frac{\partial h_\mathcal{T}}{\partial z_{\mathcal{T}|z_\mathcal{T} = I_\mathcal{T} \mu_z}} I_\mathcal{T},$$

and y can be approximated as $y \sim f_\mathcal{T}(\mu_{y,\mathcal{T}}; \Lambda_{y,\mathcal{T}})$ where $$\mu_{y;\mathcal{T}} = \mathcal{N}(h_\mathcal{T}(I_\mathcal{T} \mu_z))$$

and $$\Lambda_{y;\mathcal{T}} = A_\mathcal{T} \Lambda_z A_\mathcal{T}^T.$$

While the functions $f_\mathcal{T}$ and $f_{z,\mathcal{T}}$ can be written explicitly as functions of $x_\mathcal{T}$, and thus $\partial f_\mathcal{T} / \partial x_\mathcal{T}$ can be easily calculated, this is not true for $h_\mathcal{T}$. Yet, since $\partial f_{z,\mathcal{T}} / \partial x_\mathcal{T}$ is full rank whenever $f_{z,\mathcal{T}}$ is one-to-one, $$\partial h_\mathcal{T} / \partial z_{\mathcal{T}|z_\mathcal{T}} = \left(\partial f_{z,\mathcal{T}} / \partial x_{\mathcal{T}|x_\mathcal{T} = h_\mathcal{T}(z_\mathcal{T})}\right)^{-1}.$$

Define $$e_i = Prob\{c(f_{\mathcal{T}_i}(h_\mathcal{T}(\mathcal{J}_\mathcal{T} z))) \neq i | z \sim \mathcal{N}(\mu_z, \Lambda_z)\}$$

$$\tilde{e}_i = Prob\{c(y) \neq i | y \sim \mu_{y,\mathcal{T}_i} \Lambda_{y,\mathcal{T}_i}, \mathcal{N})\}$$

By the definition of confidence level in equation (1) above, it would be preferable to minimize $\max_i e_i$. Due the complexities arising from the nonlinearities, the technique instead focuses on minimizing $\max_i \tilde{e}_i$. However, even for that, no viable solution presents itself. $\Sigma_i \tilde{e}_i$ is therefore minimized. The solution is the maximum likelihood (ML):

$$c(y) = \arg\max_i \rho(y; \mu_i, \Lambda_i) \tag{2}$$

where we used for short $\mu_i B \mu_{y,\mathcal{T}_i}$ and $\Lambda_i B \Lambda_{y,\mathcal{T}_i}$. To see why using equation (2) indeed minimizes $\Sigma_i \tilde{e}_i$, simply note that $$\Sigma_i \tilde{e}_i = \Sigma_i \int_{\{y \in \mathbb{R}^m | c(y) \neq i\}} \rho(y; \mu_i, \Lambda_i) dy = \int_{\mathbb{R}^m} \Sigma_i$$

$$\mathcal{J}_{c(y) \neq i} \rho(y; \mu_i, \Lambda_i) dy \tag{3}$$

where $\mathcal{J}_{a(y)}(y)$ is the indicator function which is equal to one if the conditional statement a(y) is true and equal to zero if it is false.

Calculating directly with c as defined in equation (2) by integrating the normal density distribution function $\rho$ can be done numerically, but the computational complexity grows exponentially with the dimension of the measurement space, m, if accuracy is to be maintained. A good alternative is then to randomly generate enough samples of y for each topology i, and count for how many of these samples, $c(y) \neq i$. The computational complexity of this approach is still linear in the number of topologies, which in turn can be exponential in the number of switches. However, it now grows polynomially with the measurement space dimension.

Technicalities

In computing $$\frac{\partial f}{\partial x},$$

it was found easier to use Cartesian (real and imaginary) coordinates rather the polar (magnitude and angle) coordinates. Let $x_{1R}$ be the section of x corresponding to the 3 real parts of the voltages of bus 1 in a 3-phase system. Let $x_{1I}$ be the imaginary counterpart. Let $Y=1/Z$, $Y$, $Z \in \mathbb{C}^{3\times 3}$, be the complex admittance matrix of the line connecting bus 1 and bus 2, and ReY and ImY its real and imaginary part, respectively. The complex current flowing from bus 1 to bus 2 is given by:

$$I = Y(x_{2R} - x_{1R} + j(x_{2I} - x_{1I}))$$

where here $j=\sqrt{-1}$. The power flow exiting bus 1 toward bus 2 is $P_1 = (x_{1R} + jx_{1I}) \cdot \bar{I}$, $P_1 \in \mathbb{C}^3$, where · is element-wise multiplication and $\bar{I}$ is the conjugate of I. Thus, $$\frac{\partial \mathrm{Re} P_1}{\partial x_{1R}} =$$
$$\mathrm{diag}(\mathrm{Re}Y(x_{2R} - x_{1R}) - \mathrm{Im}Y(x_{2I} - x_{1I})) - \mathrm{diag}(x_{2R})\mathrm{Re}Y - \mathrm{diag}(x_{1I})\mathrm{Im}Y,$$

$$\frac{\partial \mathrm{Re} P_1}{\partial x_{2R}} = \mathrm{diag}(x_{2R})\mathrm{Re}Y + \mathrm{diag}(x_{1I})\mathrm{Im}Y,$$

with similar expressions for $\partial \mathrm{Re}P_1/\partial x_{1I}$, $\partial \mathrm{Im}P_1/\partial x_{1R}$, $\partial \mathrm{Im}P_1/\partial x_{1I}$, $\partial \mathrm{Re}P_1/\partial x_{2I}$, $\partial \mathrm{Im}P_1/\partial x_{2R}$, $\partial \mathrm{Im}P_1/\partial x_{2I}$, where diag(x) is a matrix whose diagonal is the vector x and it is zero outside its diagonal. Note that by following this way the technique is not constrained to the standard linearization technique involving the decoupling of the 'voltage angle'–'real power' and 'voltage magnitude'–'reactive power' dependencies. Power injections are then just linear combinations of the line power flows.

For power flow calculation, or solving for $x = h_{\mathcal{T}}(z)$ for which there is no explicit expression, the standard Newton-Raphson method is used, updating $$\hat{x}_{k+1} = \hat{x}_k + \left(\frac{\partial f_z}{\partial x_{|x=\hat{x}_k}}\right)^{-1} (z - f_z(\hat{x}_k)) \quad (4)$$

through several iterations until convergence.

Alternative Approach

An alternative approach to the maximum likelihood method is proposed here. The approach was investigated during this research but found to be less efficient than the ML method.

For each pair of topologies, i and j ($i \neq j$), the identification function $c_{ij}: \mathbb{R}^m \to \{i,j\}$ is defined similarly to c except that it only distinguishes between topologies i and j. c can be constructed as:

$$c(y) = i \text{ if and only if } \forall j \neq i : c_{ij}(y) = i \quad (5)$$

With this it is possible to lower bound $1 - \max_i \tilde{e}_i$ which itself is an approximation to $= 1 - \max_i e_i$ as $$1 - \max_i \int_{\bigcup_{j \neq i} \{y \in \mathbb{R}^m | c_{ij}(y) = j\}} \rho(y; \mu_i, \Lambda_i) dy \geq \quad (6)$$

$$1 - \max_i \sum_j \int_{\{y \in \mathbb{R}^m | c_{ij}(y) = j\}} \rho(y; \mu_i, \Lambda_i) dy.$$

To simplify the calculation of this lower bound, $c_{ij}$ is constructed using some $\alpha_{ij} \in \mathbb{R}^m$ and $\beta_{ij} \in \mathbb{R}$ as $$c_{ij}(y) = \begin{cases} i & \alpha_{ij}^T y \leq \beta_{ij} \\ j & \alpha_{ij}^T y > \beta_{ij} \end{cases} \quad (7)$$

if $i<j$ and $c_{ij}(y) = c_{ji}(y) \forall y$ otherwise. By assuming that y is a normal distributed random variable, $\alpha_{ij}^T y$ given topology $\mathcal{T}_i$ becomes a one dimensional normal distributed random variable with mean $\alpha_{ij}^T \mu_i$ and variance of $\alpha_{ij}^T \Lambda_i \alpha_{ij}$. In this case the bound in equation (6) becomes $$1 - \max_i \sum_j e_i^{ij}, \; e_i^{ij} B1 - \Gamma(\beta_{ij}; \alpha_{ij}^T \mu_i, \alpha_{ij}^T \Lambda_i \alpha_{ij}) \quad (8)$$

where, by convention, $\alpha_{ij} = -\alpha_{ji}$, $\beta_{ij} = -\beta_{ji} \forall i,j$, and $\Gamma(x; \mu, \sigma^2)$ is the one-dimensional normal cumulative distribution function with mean µ and variance $\sigma^2$. Reducing to one-dimensional normal distribution, regardless of the dimension of y, allows not only quickly calculating equation (8). In contrast to equation (2) which can only minimize the cost function $\Sigma_i \tilde{e}_i$, using equation (7) provides more freedom in choosing the cost function. In particular, $\max_i \tilde{e}_i$ can be minimized over all the α's and β's using constrained nonlinear minimization where the gradients of the cost function and all the constraints have explicit analytic expressions. However, because the maximum likelihood function of equation (2) is not in the family of functions defined by equations (7) and (5), it is possible, and indeed this was found to be the case, that using equation (2) will still result in a lower $\max_i \tilde{e}_i$ than had this alternative approach been used.

To demonstrate how to minimize $\max_i \tilde{e}_i$ over α's and β, consider an example having only two topologies to distinguish between, i and j. Minimizing $\max\{e_i, e_j\}$ can be cast as an analytic nonlinear constrained optimization over m+2 variables:

$$\text{minimize } e + \frac{1}{4}(\|\alpha_{ij}\|^2 - 1)^2 \quad (9)$$

$$\text{subject to } e > 1 - \Gamma(\beta_{ij}; \alpha_{ij}^T \mu_i, \alpha_{ij}^T \Lambda_i \alpha_{ij})$$

$$e > \Gamma(\beta_{ij}; \alpha_{ij}^T \mu_j, \alpha_{ij}^T \Lambda_j \alpha_{ij}).$$

One can use, for example, MATLAB's fmincon function to solve equation (9) using the sequential quadratic programming method (SQP). For that function to run efficiently, it must be supplied with the derivatives of the cost function and the constraints with respect to all the variables. Those are listed below:

$$\frac{\partial \frac{1}{4}(\|\alpha\|^2 - 1)^2}{\partial \alpha} = (\|\alpha\|^2 - 1)\alpha^T,$$

$$\frac{\partial \Gamma(\beta; \alpha^T \mu, \alpha^T \Lambda \alpha)}{\partial \beta} = \rho(\beta; \alpha^T \mu, \alpha^T \Lambda \alpha),$$

$$\frac{\partial \Gamma(\beta; \alpha^T \mu, \alpha^T \Lambda \alpha)}{\partial \alpha} = \rho(\beta; \alpha^T \mu, \alpha^T \Lambda \alpha) \left(-\mu^T - \frac{\beta - \alpha^T \mu}{\alpha^T \Lambda \alpha} \alpha^T \Lambda\right).$$

That approach is similary to a support vector machine (SVM) approach. A traditional SVM approach to the present problem would proceed as follows. Generate s random power injection profiles based on $\mu_z$ and $\Lambda_z$. For each such profile, solve the nonlinear power flow calculation and find the measurement vector values. Then run the standard SVM between each two pair of topologies to best separate between the measurement points belonging to each topology.

The main advantage of the traditional SVM approach is that by working on the measurements derived from the nonlinear power flow calculation, there is no need to revert to a linearization approximation. There are, however, at least two disadvantages to the traditional SVM. First, for the results to be reliable, s must be very large. While nonlinear power flow calculation can be evaluated quite fast, its computation time is not negligible, and when the time for a single calculation needs to be multiplied by s and by the number of topologies, it can come to a total computation time which is very substantial. In contrast, in the approach described above, only one power flow calculation per topology is needed.

The second disadvantage is that, ideally, SVM would have minimized the number of misclassified points from each topology, which is a good proxy for the confidence level when s is large enough. However, SVM does not do that, but rather minimizes the distance from the support vector to the misclassified point farthest away from the support vector. That will not necessarily lead to maximizing the confidence level, as there can still be many misclassified points.

Figure 3A:
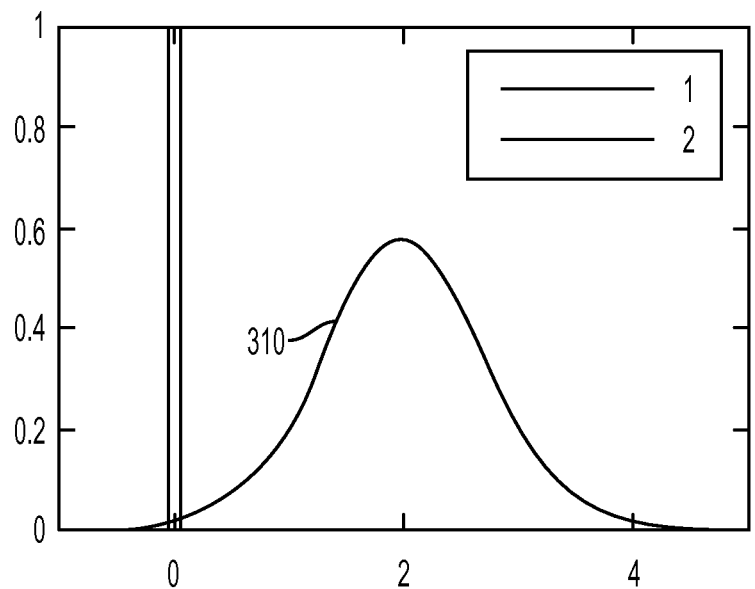
FIG. 3A is a probability distribution plot of a first bus system power flow measurement.
Figure 3B:
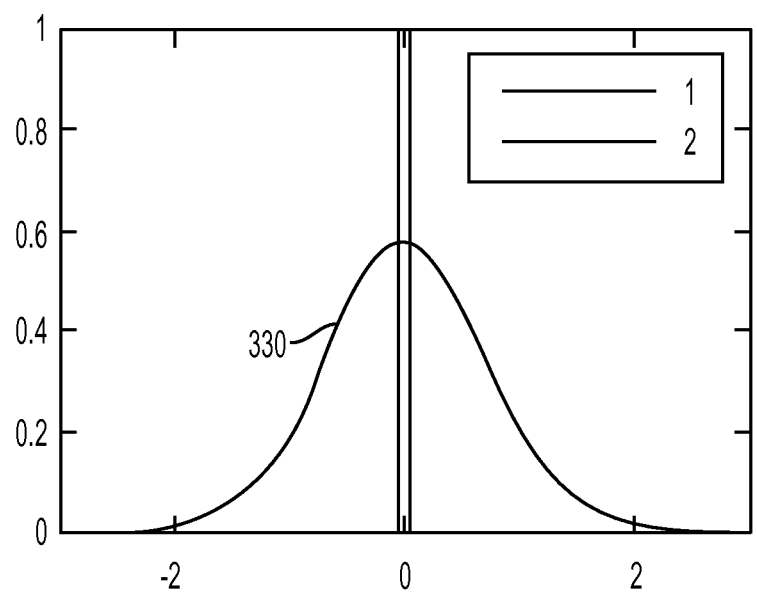
FIG. 3B is a probability distribution plot of a second bus system power flow measurement.

The following example may explain why using the maximum likelihood will provide better results then the alternative approach. The support vector approach is effective in separating distributions that are centered around distant means. Consider a system with two buses. One is the slack bus, and the other is connected to a consumer load. There is one power flow sensor on the switching device connecting the two buses. In FIG. 3A is shown the probability density function 310 of the sensor reading corresponding to the two possible topologies: a first topology in which the switching device is closed and in a second topology in which it is open. It is easy to see how very good separation may be achieved by placing the support vector just to the right of the peak corresponding to the second topology. Now consider the case wherein a distributed energy source (DER) such as photo-voltaic receptor is added to the second bus, and that on average the DER produces as much power as the consumer demands. The probability density functions 330 corresponding to the two topologies are shown in FIG. 3B. Using the maximum likelihood approach would still yield high confidence even for the second case with DER, but with the support vector approach one cannot get above 50% confidence for both topologies using one support vector.

Results

Figure 4:
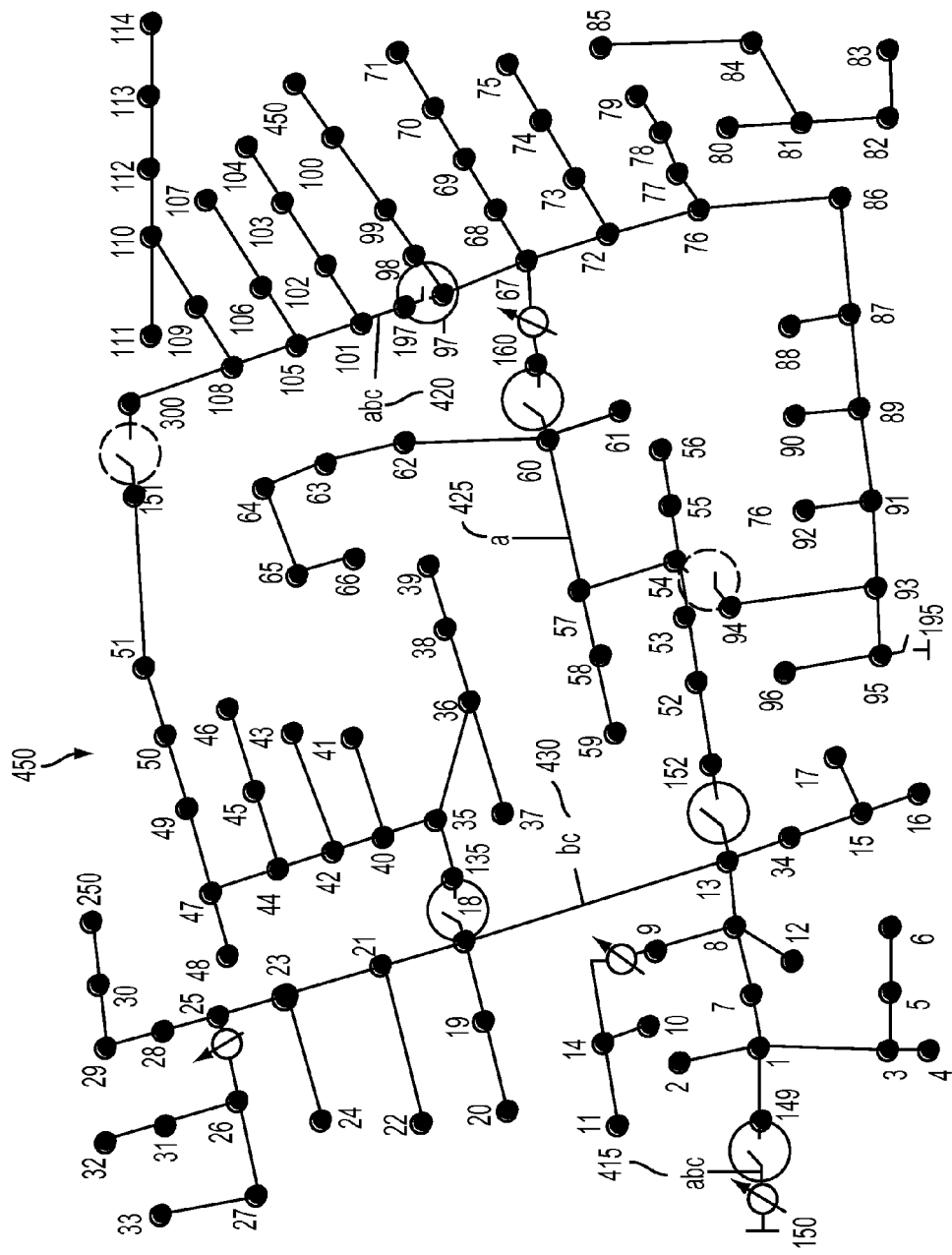
FIG. 4 is a schematic diagram of a power distribution network showing sensors and switching devices as configured.

The above approach was tested using the IEEE PES 123-bus feeder distribution test case 450, depicted in FIG. 4, which is a 3-phase system. There are seven pairs of buses connected with switching devices; each in indicated by a circle. Between buses 54 and 94 there is only one switching device on phase a. All other pairs of buses with switching devices have switching devices on all 3 phases. The switching devices connecting buses 151 and 300 in the top right corner, and the switching device connecting buses 54 and 94 in the middle bottom, are nominally open, indicated by a dashed circle. All other switching devices are nominally closed, indicated by an undashed circle. The test case 450 includes real and reactive load values at every bus. Those values were taken as mean power extraction. For purposes of testing, those values were divided by 2 and used as the standard deviation of the power extraction.

Nine real power flow sensors were added as follows: 3-phase measurements at location 415 next to the substation (bus no. 149), 3-phase measurements at location 420 between bus 197 and bus 101, 1-phase measurement (phase a) at location 425 between bus 57 and bus 60, and 2-phase measurements (phases b and c) at location 430 between bus 13 and 18. The decisions where to place the sensors was based on manual trial and error. The presently described approach was then used to find the confidence level of identifying whether any of the switching devices changed from their nominal statuses. It was assumed that only one switching device may have changed its status. The results, using 1,000 samples drawn for each topology according to $y \sim \mathcal{N}(\mu_i, \Lambda_i)$ are listed in Table 500 of FIG. 5. Table 500 shows the error rate for each switching device; i.e., the probability that the algorithm will decide that another switching device changed its status, when in fact it was the switching device listed that had changed its status. The letter in brackets in the first column represents the phase.

The results show a confidence level of 92.8%. That approximated confidence level was then compared to the empirical evidence using Monte Carlo simulations without the linear approximation. Power injection profiles were randomly generated according to $z \sim \mathcal{N}(\mu_z, \Lambda_z)$. For each switching device, the topology resulting from that switching device having changed from its nominal status was created. The nonlinear power flow calculation was performed, the sensor readings derived, and it was checked whether the approach concludes that this was the switching device that changed status. The results are very close to the approximated values. Due to the much longer running time, arising from the power flow calculations, only 100 samples were generated per topology. Despite having 10 times fewer samples, the total running time was still about 10 times longer. That explains the coarseness of the results in the right column of Table 500.

Methods

Figure 6:
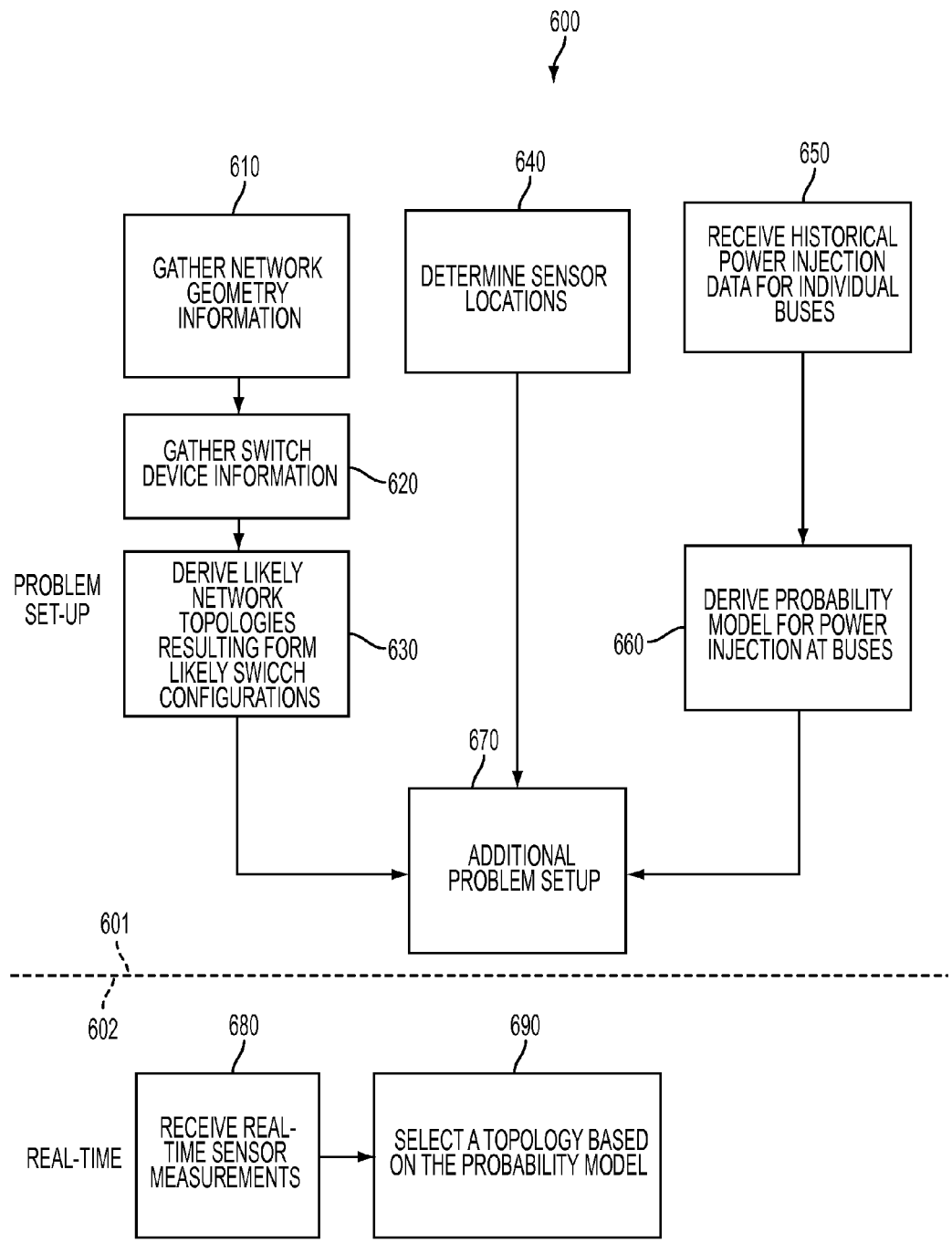
FIG. 6 is a flow chart illustrating a method in accordance with the invention.

A flowchart 600 illustrating a generalized method according to the present disclosure is shown in FIG. 6. A problem set-up phase 601 is initially performed in an off-line environment. The problem set-up need be performed only once for a given network geometry and sensor location configuration, speeding response and conserving resources during the real-time operation phase 602. During the problem set-up phase, required historical and configuration data is gathered and processed as described below.

Network state topology information is gathered at block 610, including the identification indices of the buses, the identification indices of branches and their associated terminal buses, impedances, location of the slack bus and any other information required to adequately model the distribution network. Information regarding the switch devices is also gathered at block 620. That information may include locations of the switch devices among the bus interconnections, and characteristics of the switch devices, such as normally open or normally closed.

Different network topologies result from various combinations of open and closed switch devices. From the network geometry and switch device information, a set of likely network topologies is determined at block 630. The set may include all possible network topologies resulting from all combinations of open and closed switches, or may include only the most likely of those topologies.

Sensor locations are determined at block 640. The sensors may be existing sensors in the distribution network, or may be located based on a configuration optimized for the present topology determination. For example, the sensors may be located according to a configuration determined by generating simulated sensor measurements for each of the plurality of network topologies by sampling the probability model for power injections at each of the plurality of interconnected buses, and selecting a network topology most likely to produce those simulated sensor measurements, based on the probability model. A reliability of the proposed sensor placement configuration is then determined by comparing the network topology most likely to produce the simulated sensor measurements with the network topology used in generating that simulated sensor measurement. A sensor placement configuration having a highest reliability of the proposed sensor placement configurations is then used to place the sensors.

Historical power injection data is collected (block 650) for each of the buses. The data preferably includes identifiers for the time of day, the day of the week (weekday or weekend) and the season or month of the year. Such data may be available, for example, as customer billing data. Using the historical power injection data, a probability model is derived at block 660, describing the distribution of power injection for each bus.

Additional processing using the derived network topologies, the sensor locations and the probabilities model of the bus power injection may be performed at block 670. For example, a plurality of optimization problems (not shown) may be constructed, each corresponding to one of the network topologies. Each optimization problem includes a state variable representing voltages of the plurality of interconnected buses in the network. A cost function of each optimization problem represents an unlikelihood of a set of power injections for the buses computed from the state variable, given the probability model for the power injections. Each optimization problem has constraints requiring that real time sensor measurements of electrical quantities match corresponding electrical quantities computed from the state variable.

In the real-time operation 602 of the system, real-time sensor measurements are received (block 680) from the sensors in the distribution network. A network topology is then selected from the likely network topologies based on the probability model at block 690. For example, in the case where the additional problem set-up 670 includes constructing a plurality of optimization problems, the selection of a network topology at block 690 may include selecting a network topology corresponding to an optimization problem having a minimum cost computed from the cost function.

In another embodiment, the additional problem set-up 670 may alternatively include the generation of a set of likely power injections using the probability model for power injections. For each for the network topologies, expected sensor measurements of the electrical quantities are then computed using the set of likely power injections. Using the expected sensor measurements, a probability model for sensor measurements of the electrical quantities is derived for each of the network topologies.

In that embodiment, the network topology most likely to produce the real time sensor measurements is selected at block 690 based on the probability model for sensor measurements of the electrical quantities for each of the network topologies.

System

Figure 7:
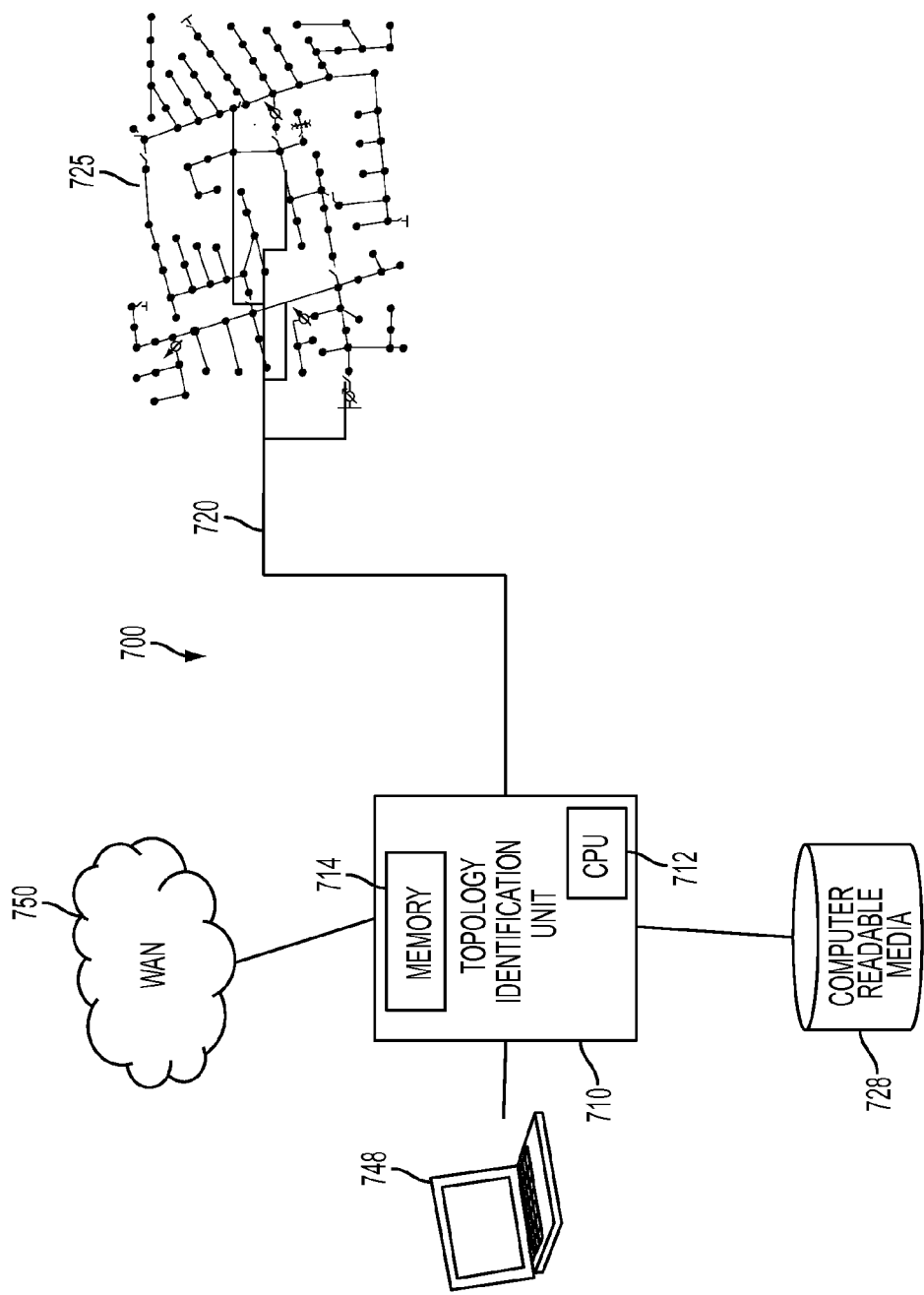
FIG. 7 is a schematic diagram showing a computer system for instantiating a system in accordance with one embodiment of the invention.

The elements of the methodology described above may be implemented in a computer system comprising a single unit or a plurality of units linked by a wired, optical or wireless network. A topology identification computer system 700 according to one embodiment is shown in FIG. 7.

A topology identification unit 710 may be a mainframe computer, a desktop or laptop computer, or any other device capable of processing data. The topology identification unit 710 may send and receive communications from any number of communications networks that may be connected to the unit, including a wide area data network (WAN) 750 such as the Internet. The unit receives data from a sensor network 720 comprising sensors measuring characteristics of a distribution network 725, as described above.

The topology identification unit 710 includes a central processing unit (CPU) 712 and a memory 714. The unit 710 may be connected to an input and/or output device such as a personal computer 748 capable of transmitting and receiving information to and from the unit. The input may be a mouse, network interface, touch screen, etc., and the output may be a liquid crystal display (LCD), cathode ray tube (CRT) display, printer, etc. Alternatively, commands containing input/output data may be passed via the network 750. The unit 710 can be configured to operate by using, e.g., the input and output devices to execute certain tasks.

The CPU 712, when configured using software according to the present disclosure, include modules that are configured for performing one or more methods for topology identification as discussed herein.

The memory 714 may include a random access memory (RAM) and a read-only memory (ROM). The memory may also include removable media such as a disk drive, tape drive, memory card, etc., or a combination thereof. The RAM functions as a data memory that stores data used during execution of programs in the CPU 712; the RAM is also used as a work area. The ROM functions as a program memory for storing a program executed in the CPU 712. The program may reside on the ROM or on any other tangible or non-volatile computer-usable medium as computer readable instructions stored thereon for execution by the CPU or another processor to perform the methods of the invention. The ROM may also contain data for use by the program or other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including programmable logic controllers, personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium 728 such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are transitory and not tangible. Cached information is considered to be stored on a tangible, non-transitory computer-readable medium. Common expedients of computer-readable media are well-known in the art and need not be described in detail here.

Conclusion

The above addresses the issue of topology identification in distribution networks using as few measurements as possible. A tool is proposed for fast and reliable comparison between different sensor placements, thus allowing an optimal placement through trial and error. Results from an IEEE PES distribution feeder test case show the potential of the tool. The tool may additionally be used to distinguish between topologies involving several circuit switching devices changing their status simultaneously, without having the running time increase exponentially. Another extension is an automatic tool for optimal sensor placement based on the proposed tool.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for restoring continuity in a distribution network including a plurality of interconnected buses and switch devices, the method comprising:
    deriving a probability model for power injections at each of the plurality of interconnected buses, the power injections comprising power consumption and power generation at individual buses, the probability model being derived from historical measurements of power injections;
    deriving a plurality of possible network topologies from a plurality of possible statuses of the switch devices as either open or closed, wherein pairs of buses connected by closed switches in the possible network topologies are treated as connected by zero impedance lines;
    receiving real time sensor measurements of electrical quantities in the distribution network;
    selecting, from the plurality of network topologies, a network topology most likely to produce the real time sensor measurements, the selecting being based on the probability model;
    based on the network topology most likely to produce the real time sensor measurements, making an identification of a normally closed switch device of the switch devices having an open status; and
    restoring continuity in the distribution network based on the identification of the normally closed switch device having an open status.

2. The method as in claim 1, wherein the selecting the network topology most likely to produce the real time sensor measurements further comprises:
    constructing a plurality of optimization problems, each optimization problem corresponding to one of the plurality of network topologies, each optimization problem having:
        a state variable representing voltages of the plurality of interconnected buses in the network;
        a cost function representing an unlikelihood of a set of power injections for the buses computed from the state variable, given the probability model for the power injections; and
        constraints requiring that the real time sensor measurements of electrical quantities match corresponding electrical quantities computed from the state variable; and
    selecting a network topology corresponding to an optimization problem having a minimum cost computed from the cost function.

3. The method as in claim 1, further comprising:
    generating a set of likely power injections using the probability model for power injections;
    for each of the network topologies, computing expected sensor measurements of the electrical quantities using the set of likely power injections; and
    using the expected sensor measurements, deriving a probability model for sensor measurements of the electrical quantities for each of the network topologies; and
    wherein selecting a network topology most likely to produce the real time sensor measurements is based on the probability model for sensor measurements of the electrical quantities for each of the network topologies.

4. The method as in claim 1, further comprising:
    generating a set of likely power injections using the probability model for power injections;
    for each of the network topologies, computing expected sensor measurements of the electrical quantities using the set of likely power injections; and
    using the expected sensor measurements, constructing a classifier to classify a set of sensor measurements of the electrical quantities into a class corresponding to a network topology; and
    wherein selecting a network topology most likely to produce the real time sensor measurements comprises classifying the real time sensor measurements using the classifier.

5. The method as in claim 4, wherein the classifier is a support vector machine.

6. The method as in claim 1, further comprising:
    computing, for each of the plurality of network topologies, an approximate linear transformation from the power injections to expected sensor measurements; and
    projecting, using the approximate linear transformations for each of the plurality of network topologies, the probability model for the power injections to probability models on the expected sensor measurements; and
    wherein selecting a network topology most likely to produce the real time sensor measurements comprises selecting the network topology using the probability models on the expected sensor measurements.

7. The method as in claim 6, further comprising:
    constructing a classifier to distinguish among the probability models on the expected sensor measurements; and
    wherein selecting a network topology most likely to produce the real time sensor measurements comprises using the classifier to identify a probability model to which the real time sensor measurements most likely belong.

8. The method as in claim 7, wherein the classifier is a support vector machine.

9. The method as in claim 1, wherein the real time sensor measurements of electrical quantities in the distribution network comprise electrical quantities selected from a group consisting of power flow, voltage and current.

10. A method as in claim 1, wherein the historical measurements of power injections are labeled with at least one time indicator selected from a group consisting of times of day, days of week and seasons of year, and the probability model for power injections includes the time indicator.

11. A method as in claim 1, further comprising:
placing sensors in the distribution network to measure the real time sensor measurements, according to a sensor placement configuration determined by, for each of a plurality of proposed sensor placement configurations, performing the following:
generating simulated sensor measurements for each of the plurality of network topologies, by sampling the probability model for power injections at each of the plurality of interconnected buses;
selecting a network topology most likely to produce the simulated sensor measurements, the selecting being based on the probability model; and
determining a reliability of the proposed sensor placement configuration by comparing the network topology most likely to produce the simulated sensor measurements with the network topology used in generating that simulated sensor measurement;
identifying a sensor placement configuration having a highest reliability of the proposed sensor placement configurations.

12. A non-transitory computer-usable medium having computer readable instructions stored thereon for execution by the processor to perform a method for restoring continuity in a distribution network including a plurality of interconnected buses and switch devices, the method comprising:
deriving a probability model for power injections at each of the plurality of interconnected buses, the power injections comprising power consumption and power generation at individual buses, the probability model being derived from historical measurements of power injections;
deriving a plurality of possible network topologies from a plurality of possible statuses of the switch devices as either open or closed, wherein pairs of buses connected by closed switches in the possible network topologies are treated as connected by zero impedance lines;
receiving real time sensor measurements of electrical quantities in the distribution network;
selecting, from the plurality of network topologies, a network topology most likely to produce the real time sensor measurements, the selecting being based on the probability model;
based on the network topology most likely to produce the real time sensor measurements, making an identification of a normally closed switch device of the switch devices having an open status; and
restoring continuity in the distribution network based on the identification of the normally closed switch device having an open status.

13. The non-transitory computer-usable medium as in claim 12, wherein the selecting the network topology most likely to produce the real time sensor measurements further comprises:
constructing a plurality of optimization problems, each optimization problem corresponding to one of the plurality of network topologies, each optimization problem having:
a state variable representing voltages of the plurality of interconnected buses in the network;
a cost function representing an unlikelihood of a set of power injections for the buses computed from the state variable, given the probability model for the power injections; and
constraints requiring that the real time sensor measurements of electrical quantities match corresponding electrical quantities computed from the state variable; and
selecting a network topology corresponding to an optimization problem having a minimum cost computed from the cost function.

14. The non-transitory computer-usable medium as in claim 12, wherein the method further comprises:
generating a set of likely power injections using the probability model for power injections;
for each of the network topologies, computing expected sensor measurements of the electrical quantities using the set of likely power injections; and
using the expected sensor measurements, deriving a probability model for sensor measurements of the electrical quantities for each of the network topologies; and
wherein selecting a network topology most likely to produce the real time sensor measurements is based on the probability model for sensor measurements of the electrical quantities for each of the network topologies.

15. The non-transitory computer-usable medium as in claim 12, wherein the method further comprises:
generating a set of likely power injections using the probability model for power injections;
for each of the network topologies, computing expected sensor measurements of the electrical quantities using the set of likely power injections; and
using the expected sensor measurements, constructing a classifier to classify a set of sensor measurements of the electrical quantities into a class corresponding to a network topology; and
wherein selecting a network topology most likely to produce the real time sensor measurements comprises classifying the real time sensor measurements using the classifier.

16. The non-transitory computer-usable medium as in claim 15, wherein the classifier is a support vector machine.

17. The non-transitory computer-usable medium as in claim 12, wherein the method further comprises:
computing, for each of the plurality of network topologies, an approximate linear transformation from the power injections to expected sensor measurements; and
projecting, using the approximate linear transformations for each of the plurality of network topologies, the probability model for the power injections to probability models on the expected sensor measurements; and
wherein selecting a network topology most likely to produce the real time sensor measurements comprises selecting the network topology using the probability models on the expected sensor measurements.

18. The non-transitory computer-usable medium as in claim 17, wherein the method further comprises:
constructing a classifier to distinguish among the probability models on the expected sensor measurements; and
wherein selecting a network topology most likely to produce the real time sensor measurements comprises using the classifier to identify a probability model to which the real time sensor measurements most likely belong.

19. The non-transitory computer-usable medium as in claim 18, wherein the classifier is a support vector machine.

20. The non-transitory computer-usable medium as in claim 12, wherein the real time sensor measurements of electrical quantities in the distribution network comprise electrical quantities selected from a group consisting of power flow, voltage and current.

21. The non-transitory computer-usable medium as in claim 12, wherein the historical measurements of power injections are labeled with at least one time indicator selected from a group consisting of times of day, days of week and seasons of year, and the probability model for power injections includes the time indicator.

22. The non-transitory computer-usable medium as in claim 21, wherein the method further comprises:
- placing sensors in the distribution network to measure the real time sensor measurements, according to a sensor placement configuration determined by, for each of a plurality of proposed sensor placement configurations, performing the following:
- generating simulated sensor measurements for each of the plurality of network topologies, by sampling the probability model for power injections at each of the plurality of interconnected buses;
- selecting a network topology most likely to produce the simulated sensor measurements, the selecting being based on the probability model; and
- determining a reliability of the proposed sensor placement configuration by comparing the network topology most likely to produce the simulated sensor measurements with the network topology used in generating that simulated sensor measurement;
- identifying a sensor placement configuration having a highest reliability of the proposed sensor placement configurations.

* * * * *